June 22, 1926.
F. W. JAUCH
1,590,032
LOCKING DEVICE FOR GAS SERVICE COCKS AND THE LIKE
Filed August 26, 1924
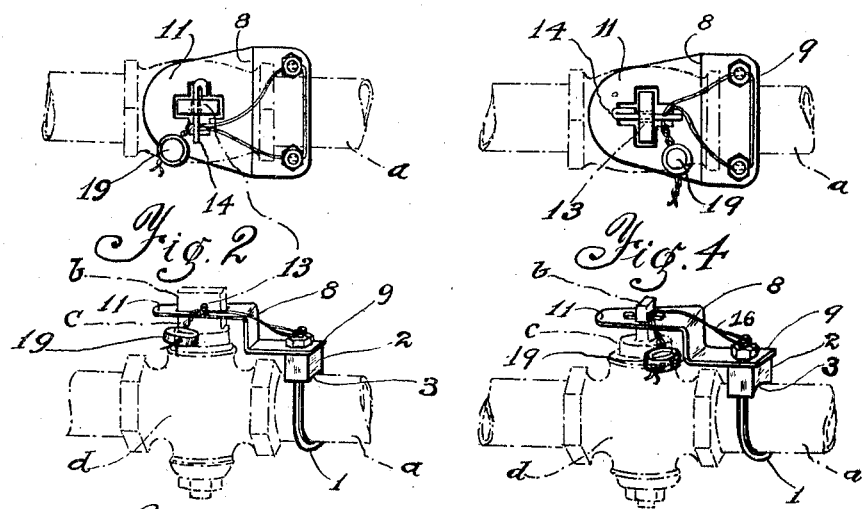
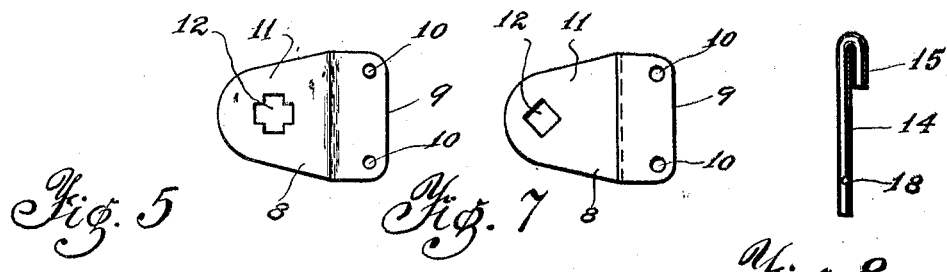
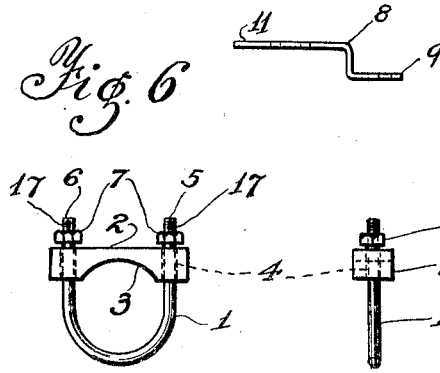
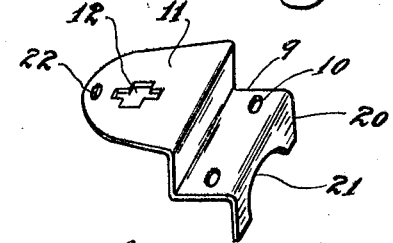
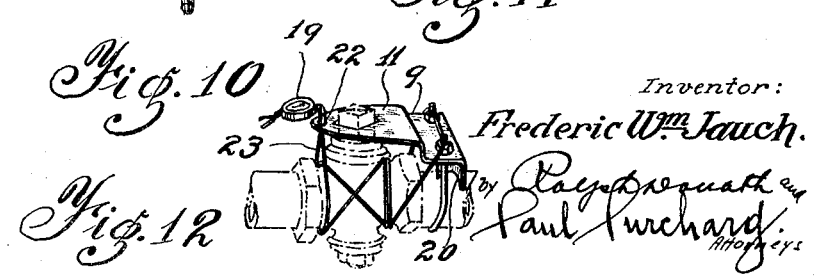
Inventor:
Frederic Wm Jauch.

Patented June 22, 1926.

1,590,032

UNITED STATES PATENT OFFICE.

FREDERIC W. JAUCH, OF PITTSBURGH, PENNSYLVANIA.

LOCKING DEVICE FOR GAS-SERVICE COCKS AND THE LIKE.

Application filed August 26, 1924. Serial No. 734,222.

This invention relates to locking devices and is especially intended to be used in connection with gas service cocks and gas meter cocks, or any other cock placed under control.

The primary object of this invention is to provide a simple device for preventing, or divulging, the unauthorized opening or closing of gas service cocks. Another object is to provide a device which is easily adapted for use in connection with all types of service cocks now in general use, and whereby cocks having divers shapes of plug-heads may be sealed in "open" or "closed" position as required. A further object is to provide a locking device which is simple in construction and application and which can be manufactured at relatively low cost. Additional features and advantages of this invention will appear from the following specification considered in connection with the accompanying drawing forming a part of this application and in which:

Fig. 1 is a perspective view showing a gas service cock locked and sealed into the "open" position by means of my locking device.

Fig. 2 is a top plan view of Fig. 1.

Fig. 3 is a similar view to Fig. 1, but corresponding to the "closed" position of the gas service cock.

Fig. 4 is a top plan view of Fig. 3.

Fig. 5 is the top plan view of a lock-plate used in my device and intended for gas service cocks having rectangular plug-heads.

Fig. 6 is a side elevation of Fig. 5.

Fig. 7 is a top plan view of a lock-plate for service cocks having square plug-heads.

Fig. 8 represents a lock-pin used in my locking device.

Fig. 9 is a front view showing a U-bolt and yoke member forming part of the device.

Fig. 10 is a side view of Fig. 9.

Fig. 11 is a perspective view of a modified form of lock-plate.

Fig. 12 is a perspective view showing a modified method of sealing a gas service plug provided with the lock-plate shown in Fig. 11.

In my Letters Patent Number 1,467,000, issued on September 4, 1923, I disclosed a lock-bolt adapted to a special type of gas service cock. The present device, however, is more universal in its application being adaptable, with but a slight change to service cocks having variously shaped plug-heads.

Reference being had to the different figures, the preferred embodiment of my locking device for gas service cocks comprises a U-bolt 1 (of the required size to accommodate the gas pipe "a") on which is mounted the yoke-member 2, the lower side of which is provided with a circular recess 3 engaged by the pipe. Suitable apertures 4 are also provided in the yoke to receive the threaded and free ends 5 and 6 of the U-bolt to which it is secured by means of the bolt-nuts 7.

Secured intermediate said nuts and the yoke is the lock-plate 8 bent substantially into the shape of the letter Z. In the lower plane portion 9 of said plate are provided the apertures 10 for the bolt, and in the upper plane portion 11 is provided an aperture 12 which is to be engaged by the head "b" of the plug "c" of the service cock "a". This aperture varies in shape in accordance with the shape of the plug-head. Thus, if used in connection with a service cock having a plug-head of rectangular shape, said aperture will assume the cruciform shape illustrated especially in Figs. 5 and 11, in order to accommodate said plug-head in the "open" or "closed" positions. If used in conjunction with a service cock having a square plug-head, the aperture in the lock-plate will also be square, as shown in Fig. 7.

It may be stated here that the reason for giving the lock-plate the shape of a Z is to economize material because the plug head is considerably higher than the top of the pipe upon which is mounted the yoke 2, and, therefore, the use of a straight lock-plate would require a much higher yoke.

A hole 13 is provided in the plug-head "b" at a point slightly above the upper plane portion of the lock-plate, and a metal lock-pin 14, having one end folded double to form a head 15, is passed through the plug-head to prevent the forceful holding up of the lock-plate over the plug-head.

Also, to hinder, or expose, any unauthorized opening or closing of the service-cock, my locking device is protected by means of a flexible wire 16 which is passed first through suitable apertures 17 drilled in both legs of the U-bolt at a point above the nuts 7 (to prevent their removal) and then both ends of the wire are inserted through an aperture 18 provided in the lock-pin 14. Both ends of the wire are then sealed by an authorized agent or plumber who applies a lead-seal 19 upon which his license number, or other identification mark, may be impressed.

In Fig. 11 is shown a modified form of lock-plate by the use of which the yoke member may be eliminated. As shown in this figure, the lower plane portion 9 of the lock-plate is provided with a downwardly directed extension 20 in which a portion 21 of circular shape has been cut away to accommodate the pipe "a." If desired, the upper plate portion may be furnished at its forward end with an aperture 22 by means of which the use of the lock-pin 14 may also be dispensed with. This is done by passing the sealing wire 23 first through the apertures in the U-bolt, then wrapping said wire around the body of the service cock a few times, and finally inserting both ends of the wire through the aperture 22 prior to affixing the lead seal 19. This method is illustrated in Fig. 12.

The reasons and advantages of protecting gas service cocks against unauthorized tampering have been fully explained in the aforementioned Letters Patent and, therefore, it is not thought necessary to recount them here again. Suffice to say that said advantages are very serious and have met with the approval of experts in the art.

The method of locking a gas service cock in either "open" or "closed" position will be readily ascertained by having reference to the drawing. It will be seen therefrom that, after the service cock has been turned by means of a wrench into the desired position, the U-bolt is first placed over the gas-pipe "a," the yoke member is then put on and the lock-plate is passed over the plug-head and the whole device is finally sealed by means of the sealing wire and the lead seal, in the manner described above.

As will be understood, as suggested herein, there may be slight changes made in the construction and arrangement of the details of my invention without departing from the field and scope of the same, and I intend to include all such variations, as fall within the scope of the appended claims, in this application in which the preferred forms only of my invention have been disclosed.

What I claim is:—

1. In combination with a gas service cock and the like, a locking device comprising a U-bolt and a yoke adapted to engage the supply pipe of said cock; a lock-plate secured to said U-bolt and yoke; said lock-plate being bent substantially in the shape of a Z and having a unitary aperture provided in the upper plane portion thereof adapted to be engaged by the plug of said cock and prevent the rotation of said plug.

2. In combination with a gas service cock and the like, a locking device comprising a U-bolt adapted to engage the supply pipe of said cock; a lock-plate secured to said U-bolt; said lock-plate being bent to present two substantially horizontal planes positioned at different levels; the upper of said planes having provided therein a unitary aperture adapted to be engaged by the plug of said cock and prevent the rotation of said plug; the lower plane having apertures engaged by said U-bolt and a downwardly directed extension adapted to bear upon said supply pipe.

In testimony whereof I affix my signature.

FREDERIC WM. JAUCH.